United States Patent [19]

Kunstmann et al.

[11] Patent Number: 5,269,843
[45] Date of Patent: Dec. 14, 1993

[54] BORON-CONTAINING IRON OXIDE PIGMENTS AND A PROCESS FOR THEIR PREPARATION

[75] Inventors: Herbert Kunstmann; Gunter Buxbaum, both of Krefeld; Horst Brunn, Meerbusch, all of Fed. Rep. of Germany

[73] Assignee: Bayer Aktiengesellschaft, Leverkusen, Fed. Rep. of Germany

[21] Appl. No.: 962,812

[22] Filed: Oct. 19, 1992

[30] Foreign Application Priority Data

Oct. 30, 1991 [DE]  Fed. Rep. of Germany ....... 4135742

[51] Int. Cl.$^5$ ............................................. C09C 1/22
[52] U.S. Cl. ..................................... 106/459; 106/456
[58] Field of Search ............................... 106/456, 459

[56] References Cited

U.S. PATENT DOCUMENTS 4,358,431  11/1982  Brunn et al. ...................... 423/632
4,911,760  3/1990  Burou et al. ...................... 106/459

Primary Examiner—Mark L. Bell
Assistant Examiner—Chris Gallo
Attorney, Agent, or Firm—Connolly & Hutz

[57] ABSTRACT

Boron-containing iron-oxide pigments as disclosed which are prepared by a nitrobenzene reduction process. The boron is present in the pigments in a homogeneously doped form in amounts of 0.02 to 0.13% by weight, based on iron oxide. Preparation of the pigments is also described.

7 Claims, 2 Drawing Sheets

_Fig.1._

BORON-CONTAINING IRON OXIDE PIGMENTS AND A PROCESS FOR THEIR PREPARATION

The present invention relates to boron-containing iron oxide pigments obtained by the nitrobenzene reduction process and to a process for their preparation.

Iron oxide black pigments may be prepared by various processes. It is known from DE-A 2 612 798 and DE-A 2 617 568 that iron oxide black pigments may be obtained by the reaction of iron salts with alkalies. One important disadvantage of this process is that a quantity of neutral salt equivalent to the quantity of alkalies put into the process is formed.

The reductive roasting known from DE-A 2 653 765 has the disadvantage of giving rise to roasting gases. DE-A 334 185 describes the reduction of FeOOH or $Fe_2O_3$ at elevated temperatures with reducing gases such as hydrogen. Handling hydrogen or combustible gases at elevated temperatures is, however, an expensive procedure.

The reaction of iron scrap with atmospheric oxygen in a weakly acid medium described in DE-A 2 617 569 has the disadvantage of low reactive velocities.

Lastly, the preparation of iron oxide pigments by the reaction of aromatic nitro compounds with iron to form aromatic amines and iron oxide pigments is disclosed in DE-C 703 416, DE-C 551 255 and DE-C 518 929.

The iron oxide pigments obtained may be yellow (alpha-FeOOH), red (alpha-$Fe_2O_3$) or black ($Fe_3O_4$), depending on the quality of the iron (granules, cast iron turnings) and the control chemicals used. The iron used for the preparation of iron oxide black pigments by the last-mentioned process is mainly cast iron turnings as this is an inexpensive form of iron. The particle size is controlled by varying the process as required, by using control chemicals and by suitable choice of the iron quality. Very finely divided pigments obtained by this process have, however, such a pronounced brown tinge that they cannot be used for colouring purposes.

Various substances have been proposed for stabilizing such finely divided pigments. Apart from organic nitrogen compounds, boric acid and their salts (DE-A 3 211 327) which are applied to the pigments are very effective. Such after-treatment substances applied to the surface, however, in no case improve the colorimetric values or the crystallite size distribution but lead to an undesirable increase in the proportion of water-soluble salts.

Iron oxide pigments with an intense colour or neutral in colour or with a blue tinge, such as are preferred for the lacquer and building material industry, could not hitherto be obtained by the nitrobenzene reduction process unless they were subjected to a temperature after-treatment at 200°-800° C. in a non-oxidizing atmosphere, as disclosed in DE-C 3 620 333.

Exceptionally finely divided iron oxide black pigments with a brown tinge are required for for producing iron oxide pigments which are light red in colour with a yellow tinge. Such finely divided preliminary products may be obtained by using sulphur compounds as control chemicals in the nitrobenzene reduction process, as disclosed in DE-A 2 414 805. When this method is employed, however, part of the sulphur is incorporated in the preliminary product, which then has a sulphur content of 0.4%. When this product is annealed to produce the red pigment, this sulphur content causes contamination of the exhaust gases with $SO_2$, which necessitates subsequent purification of the gases.

It is therefore an object of the present invention to produce an iron oxide pigment free from the above described disadvantages by the nitrobenzene reduction process.

It has now been found that these requirements are fulfilled by boron-containing iron oxide pigments obtained by the nitrobenzene reduction process, which pigments are characterised in that the boron is present in a homogeneously doped form and the boron content is from 0.02 to 0.13% by weight, based on the iron oxide.

Preferred iron oxide pigments for the purpose of this invention are iron oxide black pigments ($Fe_3O_4$) having a boron content of from 0.02 to 0.06% by weight, based on $Fe_3O_4$. Iron oxide black pigments according to the invention having a sulphur content of from 0.05 to 0.08% by weight, based on the $Fe_3O_4$, are particularly preferred.

Iron oxide black pigments which are particularly preferred according to the invention have a crystal size of <100 nm and a relative colour intensity of more than 110%, preferably from 130 to 170%, at a Delta $b^*$ of from 3.5 to −0.3 units, based on Bayferrox 330 ®. Bayferrox 330 ® is a Trade Product of Bayer AG. It is an $Fe_3O_4$ pigment of intense colour and has a specific surface area of about 15 $m^2/g$ and an average crystal size of about 83 nm.

The iron oxide pigments according to the invention also differ outwardly from comparable pigments.

BRIEF DESCRIPTION OF THE DRAWINGS

Thus iron oxide black pigments produced by the conventional nitrobenzene reduction process are recognisable under electron microscopic magnification by the irregularly cleft surface (FIG. 1). The products according to the invention, on the other hand, have smoother pigment surfaces (FIG. 2).

The iron oxide black pigments according to the invention are eminently suitable for use as black pigments for colouring plastics, building materials and lacquers. They are also suitable for annealing to form red pigments. These iron oxide red pigments are also a subject of the present invention. They are characterised by a boron content of from 0.02 to 0.13% by weight, based on the $Fe_2O_3$.

Figure 2:
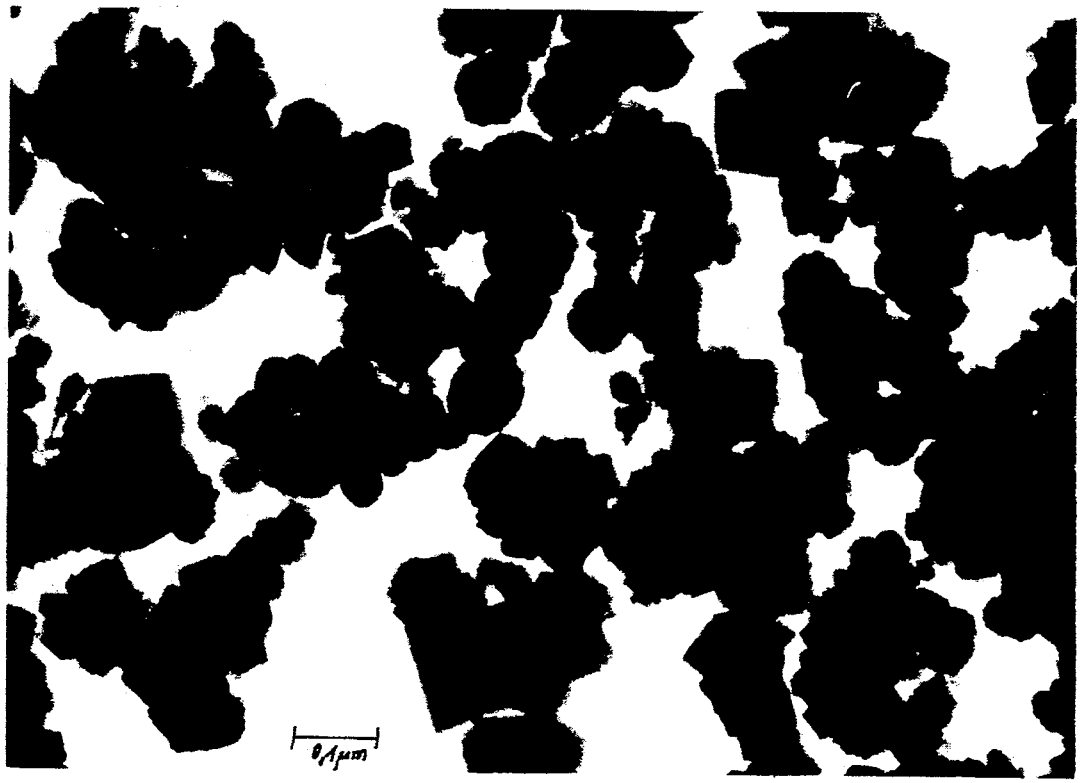

The iron oxide black pigments according to the invention may be obtained surprisingly simply by adding soluble boron compounds to the iron salt solution used in the nitrobenzene reduction process.

The present invention thus also relates to a process for the preparation of iron oxide black pigments by the reaction of aromatic nitro compounds with metallic iron in the presence of iron salt solutions, optionally with the addition of control chemicals, to produce finely divided pigments consisting predominantly of $Fe_3O_4$, the reaction being carried out in the presence of boron in the form of its soluble oxygen acids or oxides and/or salts thereof in quantities of from 0.25 to 3.91 mol-%, calculated as boron and based on the nitro compounds.

In a preferred embodiment of the process according to the invention, an $FeCl_2$ solution required for the preparation of finely divided pigments contains from 2.4 to 31 mol-% of boron, based on the iron, in the form of soluble boron compounds, and the desired fineness of subdivision is adjusted by the quantity of boron added.

A boron content of from 3.7 to 14.7 mol-% is particularly preferred. This shows that the addition of even small quantities of boron compounds is highly effective. Especially advantageous results are obtained when the boron is used in the form of its oxygen compounds. Examples of the boron compounds according to the invention include borates such as $Na_2B_4O_7$ and oxygen acids such as $H_3BO_3$. The iron may be used in the form of cast iron turnings, granules, etc..

In contrast to the after-treatment disclosed in DE-A 3 211 327, in which boric acid or a salt thereof is applied to the pigment surface, in the pigments according to the invention the boron is uniformly incorporated in the pigment particles, as can be clearly shown by SIMS analyses (secondary ion mass spectroscopy). Whereas in the case of pigments which have been after-treated with boron compounds 99% of the boron applied can still be extracted by treatment with hot water, only about 25% of the boron content can be extracted from the pigments according to the invention. Even when the pigments are annealed to form red pigment, no significant loss of boron occurs.

The black magnetite pigments prepared by the process according to the invention may be converted into red pigments in various colour shades by subsequent annealing. This is preferably carried out by annealing in air at temperatures from 600° to 1000° C., preferably 700° to 900° C.

The process according to the invention may generally be carried out as follows: Part of the iron and of the aromatic nitro compound is added to a boron-containing $FeCl_2$ solution which is then heated to reflux. Addition of the remaining iron and aromatic nitro compound results in a black suspension which is worked up in known manner and may be converted into a red pigment by annealing in air at 600° to 1000° C., preferably at 700° to 900° C. An $FeCl_2$ solution having an $FeCl_2$ content of from 25 to 350 g/l and containing from 2.4 to 31 mol-% of boron in the form of boric acid or disodium tetraborate is preferably used as starting material and part of the nitrobenzene and of the iron filings is added at the same time. Table 1 shows that when the boron content is 30 mol-%, exceptionally finely divided pigments having crystallite sizes of from 45 to 60 nm are obtained. This is, however, as a rule accompanied by a reduction in colour intensity, so that the addition of a larger quantity of boron does not appear to be desirable. When the reaction mixture has reached boiling point, the remainder of the iron and of the nitrobenzene are slowly added. After termination of the reaction, the major proportion of the aniline formed is decanted off and the residue left in the iron oxide suspension is driven off with steam. After the residual salts have been washed out with water, the remaining iron oxide sludge is filtered off and dried at temperatures of from 40° to 105° C. for 1 to 20 hours.

The boron content is preferably adjusted to concentrations of up to 5 mol-% of the $FeCl_2$ solution to increase the intensity of colour. The pigments according to the invention are predominantly blue tinged, as can be recognised from the negative Delta-b* values.

Finely divided brown tinged black pigments such as are required for annealing to light red pigments with a yellow tinge are obtained by adding larger quantities of boron to the starting material. Red pigments having a purer, more saturated colour than those produced by the conventional method using sulphuric acid can be obtained, as can be seen from the positive Delta c* values. At the same time, the addition of boric acid increases the fineness of subdivision more effectively than the addition of sulphuric acid and at the same time avoids the above-described disadvantages.

The invention will now be described with the aid of Examples which are not to be regarded as limiting.

EXAMPLES

Example 1

1 g of disodium tetraborate is dissolved in 77 ml of $FeCl_2$ solution (345 g/l). 174 g of cast iron filings and 9 ml of nitrobenzene are added to the solution which is then heated to boiling with stirring and reflux cooling. A further 160 ml of nitrobenzene and 104 g of iron filings as well as 104 ml of water are then introduced within 320 minutes. When the reaction is completed, the aniline formed is separated from the resulting magnetite by steam distillation after the addition of 130 ml of water. The magnetite slurry which is free from aniline is freed from residues of iron, washed until free from salt and filtered. The filter residue is dried in a circulating air drying cupboard at 40° C. for 20 hours and passed through a sieve.

Determination of the colour values was carried out on a white dilution (mixing of the black pigment with a commercial $TiO_2$ white pigment in a ratio by weight of 1:5) by the method of ISO 7224-2 and the results of the measurements were converted into CIELAB 2/d-values according to ISO 7724-3 and compared with the Trade Product of Bayer AG, Bayferrox ® 330 in Alkyldal ® F 48-lacquer (Trade product of Bayer AG) negative Delta b*-values characterising a blue tinge. All pigments were ground for 30 seconds in a vibratory ball mill (Microdismembrator II of B. Braun Company) unless otherwise described.

The specific surface area was determined by the one point BET method with nitrogen (DIN 66131); the average crystallite size was determined radiographically from the integral line width of a diffraction reflex.

Relative colour intensity, Delta b*, average crystallite size and specific surface area in Examples 1-11 are summarized in Table 1, the values of Comparison Examples 1-3 in Table 2, the colour values of the red pigments in Table 3 and the boron contents of Examples 1-11 in Table 4.

Example 2

3 g of Disodium tetraborate are dissolved in 77 ml of $FeCl_2$ solution (345 g/l). 174 g of cast iron filings and 9 ml of nitrobenzene are added to the solution and the solution is heated to the boiling temperature with stirring and reflux cooling. A further 160 ml of nitrobenzene and 104 g of iron flings and 104 ml of water are introduced within 322 minutes. After completion of the reaction, the product is worked up and tested as in Example 1.

Example 3

0.3 g of Boric acid are dissolved in 86 ml of $FeCl_2$ solution (314 g/l). 174 g of cast iron filings and 9 ml of nitrobenzene are added t the solution and the solution is heated to boiling with stirring and reflux cooling. A further 160 ml of nitrobenzene and 104 g of iron filings as well as 104 ml of water are added in the course of 320 minutes. After completion of the reaction, the product is worked up and tested as in Example 1.

Example 4

0.6 g of Boric acid are dissolved in 86 ml of FeCl$_2$ solution (314 g/l). 174 g of cast iron filings and 9 ml of nitrobenzene are added to the solution and the solution is heated to the boiling temperature with stirring and reflux cooling. A further 160 ml of nitrobenzene and 104 g of iron filings as well as 104 ml of water are then added within 320 minutes. After completion of the reaction, the product is worked up and tested as in Example 1 with the exclusion of the colour values, which were determined in Alkyldal ® L 64 lacquer (Trade product of Bayer AG).

Example 5

21.3 g of Boric acid are dissolved in 2900 ml of an FeCl$_2$ solution (330 g/l) and 2000 ml of water. 6200 g of cast iron filings and 320 ml of nitrobenzene are added to this solution and the solution is heated to the boiling temperature with stirring and reflux cooling. A further 5700 ml of nitrobenzene and 3700 g of iron filings as well as 3700 ml of water are then added within 320 minutes. After completion of the reaction, the anilined formed is removed by suction filtration and the residue left in the iron oxide slurry is removed by steam distillation after the addition of 3600 ml of water. When the magnetite slurry is free from aniline, it is washed free from salt and filtered. The filter residue is dried in a circulating air drying cupboard at 40° C. for 20 hours and passed through a sieve. Testing is carried out as in Example 4.

Example 6

1.7 g of Boric acid are dissolved in 86 ml of FeCl$_2$ solution (314 g/l). 174 g of cast iron filings and 9 ml of nitrobenzene are added to the solution and the solution is heated to the boiling temperature with stirring and reflux cooling. A further 160 ml of nitrobenzene and 104 g of iron filings as well as 104 ml of water are then added within 320 minutes. After completion of the reaction, the product is worked up and tested as in Example 4.

10 g of the dried black pigment are annealed at 750° C. for 30 minutes in a flat dish inside a muffle furnace to produce a red pigment. The colour values of the red pigment were measured in full shade by the method of ISO 7224-2 and converted into CIELAB 2/d values according to ISO 7724-3 and compared with the Trade Product of Bayer AG, Bayferrox ® 110 in Alkyldal L 64 lacquer (Trade product of Bayer AG).

Example 7

60.4 g of Boric acid are dissolved in 2900 ml of an FeCl$_2$ solution (330 g/l) and 2000 ml of water. 6200 g of cast iron filings and 320 ml of nitrobenzene are added to the solution and the solution is heated to the boiling temperature with stirring and reflux cooling. A further 5700 ml of nitrobenzene and 3700 g of iron filings as well as 3700 ml of water are added within 320 minutes. After completion of the reaction, the aniline formed is removed by suction filtration and the residue left in the iron oxide slurry is removed by steam distillation after the addition of 3600 ml of water. When the magnetite slurry is free from aniline it is washed free from salt and filtered. The filter residue is dried in a circulating air drying cupboard at 40° C. for 20 hours and passed through a sieve. Testing is carried out as in Example 4.

Example 8

4 g of Boric acid are dissolved in 77 ml of FeCl$_2$ solution (345 g/l). 174 g of cast iron filings and 9 ml of nitrobenzene are added to the solution and the solution is heated to the boiling temperature with stirring and reflux cooling. A further 160 ml of nitrobenzene and 104 g of iron filings as well as 104 ml of water are then added within 317 minutes. After completion of the reaction, the product is worked up and tested as in Example 1.

Example 9

1.5 g of Boric acid and 1.8 g of AlOOH are dissolved in 124.8 ml of FeCl$_2$ solution (325 g/l). 312 g of cast iron filings and 16 ml of nitrobenzene are added to the solution and the solution is heated to the boiling temperature with stirring and reflux cooling. A further 328 ml of nitrobenzene and 125 g of iron filings as well as 219 ml of water are then added within 361 minutes. After completion of the reaction, the product is worked up and tested as in Example 4.

10 g of the dried black pigment are annealed to red pigment by heating to 800° C. for 30 minutes in a flat dish inside a muffle furnace. Determination of the colour values of the red pigment was carried out as in Example 6.

Example 10

1.5 g of Boric acid and 0.5 ml of conc. phosphoric acid are dissolved in 124.8 ml of FeCl$_2$ solution (325 g/l). 312 g of cast iron filings and 16 ml of nitrobenzene are added to the solution and the solution is heated to the boiling temperature with stirring and reflux cooling. A further 328 ml of nitrobenzene and 125 g of iron filings as well as 219 ml of water are then added within 350 minutes. After completion of the reaction, the product is worked up and tested as in Example 4.

10 g of the dried black pigment are annealed to form red pigment in a muffle furnace by heating to 800° C. for 30 minutes in a flat dish. Determination of the colour values of the red pigment was carried out as in Example 6.

Example 11

1.5 g of Boric acid and 1.8 g of AlOOH are dissolved in 166 ml of FeCl$_2$ solution (325 g/l). 312 g of cast iron filings and 16 ml of nitrobenzene are added to the solution and the solution is heated to the boiling temperature with stirring and reflux cooling. A further 328 ml of nitrobenzene and 125 g of iron filings as well as 219 ml of water are then added within 350 minutes. After completion of the reaction, the product is worked up and tested as in Example 4.

10 g of the dried black pigment are annealed to form red pigment by heating to 800° C. for 30 minutes in a flat dish inside a muffle furnace. The colour values of the red pigment were determined as in Example 6.

Comparison Example 1

20.5 ml of water, 174 g of cast iron filings and 7.4 ml of nitrobenzene are added to 70 ml of an FeCl$_2$ solution (324 g/l) and the solution is heated to boiling with stirring and reflux cooling. A further 162 ml of nitrobenzene and 150 g of iron filings as well a s 120 ml of water are then added within 375 minutes. A further 24 g of cast iron filings are then added. After completion of the reaction, the product is worked up and tested as in Example 4.

Comparison Example 2

288 ml of conc. sulphuric acid are dissolved in 2900 ml of an $FeCl_2$ solution (330 g/l) and 2000 ml of water. 6200 g of cast iron filings and 320 ml of nitrobenzene are added to the solution and the solution is heated to boiling with stirring and reflux cooling. A further 5700 ml of nitrobenzene and 370 g of iron filings as well as 3700 ml of water are then added within 320 minutes. After completion of the reaction, the aniline formed is removed by suction filtration and the residue left in the iron oxide slurry is removed by steam distillation after the addition of 3600 ml of water. When the magnetite slurry is free from aniline, it is washed free from salts and filtered. The filter residue is dried in a circulating air drying cupboard at 40° C. for 20 hours and passed through a sieve. Testing is carried out as in Example 4.

Comparison Example 3

5.6 ml of conc. sulphuric acid and 0.2 ml of conc. phosphoric acid are dissolved in 133 ml of $FeCl_2$ solution (304 g/l) and 36 ml of water. 312 g of cast iron filings and 16 ml of nitrobenzene are added to the solution and the solution is heated to boiling with stirring and reflux cooling. A further 328 ml of nitrobenzene and 125 g of iron filings as well as 219 ml of water are then added within 350 minutes. After completion of the reaction, the product is worked up and tested as in Example 4.

10 g of the dried black pigment are annealed to red pigment in a muffle furnace by heating at 750° C. for 30 minutes in a flat dish. Determination of the colour values of the red pigment was carried out as in Example 6.

TABLE 1

| Ex. No. | Control Chemicals | Average crystallite size [nm] | Specific surface area [m²/g] | Relative colour intensity [%] | Delta b* | Mol-% boron $FeCl_2$ based on $FeCl_2$ in starting solution | % by wt. boron based on nitro-benzene | Boron content in $Fe_3O_4$ [%] (theoretical) | Boron content in $Fe_3O_4$ [%] found |
|---|---|---|---|---|---|---|---|---|---|
| 1 | Disodium tetraborate | 95 | 8.7 | 110 | −0.2 | 9.6 | 0.11 | 0.076 | — |
| 2 | Disodium tetraborate | 62 | 6.1 | 62 | −0.9 | 28.4 | 0.32 | 0.227 | 0.073 |
| 3 | Boric acid | 95 | 10.9 | 136 | −0.2 | 2.3 | 0.03 | 0.019 | — |
| 4 | Boric acid | 63 | 10.7 | 157 | 0.6 | 4.6 | 0.05 | 0.037 | 0.025 |
| 5 | Boric acid | 95 | 9.3 | 111 | −0.4 | 4.6 | 0.05 | 0.037 | 0.025 |
| 6 | Boric acid | 49 | 12.9 | 146 | 2.1 | 13.1 | 0.15 | 0.105 | 0.056 |
| 7 | Boric acid | 73 | 10.6 | 146 | 0.8 | 12.9 | 0.15 | 0.105 | 0.060 |
| 8 | Boric acid | 46 | 4.0 | 38 | −1.1 | 30.8 | 0.34 | 0.246 | 0.130 |
| 9 | Boric acid/AlOOH | 66 | 14.3 | 169 | 1.5 | 7.2 | 0.06 | 0.045 | — |
| 10 | Boric acid/phosphoric acid | 67 | 12.4 | 175 | 2.2 | 7.2 | 0.06 | 0.045 | — |
| 11 | Boric acid/AlOOH | 81 | 11.8 | 163 | 0.6 | 5.7 | 0.06 | 0.045 | — |

TABLE 2

| | Comparison Examples | | | |
|---|---|---|---|---|
| Example No. | Control chemicals | Average crystallite size [nm] | Specific surface area [m²/g] | Relative colour intensity [%] | Delta b* |
| 1 | none | 96 | 8.4 | 97 | −1.4 |
| 2 | Sulphuric acid | 85 | 10.7 | 93 | 0.4 |
| 3 | Sulphuric acid/phosphoric acid | 60 | 14.7 | 161 | 2.8 |

TABLE 3

| | Annealing to red pigment | | | |
|---|---|---|---|---|
| Starting material | Delta L* | Delta a* | Delta b* | Delta C* |
| Table 1, No. 6 | −0.1 | −0.3 | −0.3 | −0.4 |
| Table 1, No. 9 | 0.1 | 1.0 | 0.3 | 1.0 |
| Table 1, No. 10 | 0.0 | 0.4 | 0.2 | 0.4 |
| Table 1, No. 11 | −0.9 | 1.0 | −1.1 | 0.1 |
| Table 2, No. 3 | 0.0 | 0.2 | 0.2 | 0.2 |

TABLE 4

| | | Boron contents | | | |
|---|---|---|---|---|---|
| Ex. No. | Control chemicals in starting materials | Mol-% Boron based on $FeCl_2$ in starting solution | Mol.-% Boron based on nitrobenzene | Boron content in $Fe_3O_4$ [%] theoretical | Boron content in $Fe_3O_4$ [%] found |
| 1 | 1 g Disodium tetraborate | 9.6 | 1.20 | 0.076 | — |
| 2 | 3 g Disodium tetraborate | 28.4 | 3.61 | 0.227 | 0.073 |
| 3 | 0.3 g boric acid | 2.3 | 0.29 | 0.019 | — |
| 4 | 0.6 g boric acid | 4.6 | 0.59 | 0.037 | 0.025 |
| 5 | 21.3 g boric acid | 4.6 | 0.59 | 0.037 | 0.025 |
| 6 | 1.7 g boric acid | 13.1 | 1.66 | 0.105 | 0.056 |
| 7 | 60.4 g boric acid | 12.9 | 1.66 | 0.105 | 0.060 |

TABLE 4-continued

| Ex. No. | Control chemicals in starting materials | Boron contents | | | |
| --- | --- | --- | --- | --- | --- |
| | | Mol-% Boron based on FeCl$_2$ in starting solution | Mol.-% Boron based on nitrobenzene | Boron content in Fe$_3$O$_4$ [%] theoretical | Boron content in Fe$_3$O$_4$ [%] found |
| 8 | 4.0 g boric acid | 30.8 | 3.91 | 0.246 | 0.130 |
| 9 | 1.5 g boric acid/ 1.8 g AlOOH | 7.2 | 0.72 | 0.045 | — |
| 10 | 1.5 g boric acid/ 0.5 ml phosphoric acid | 7.2 | 0.72 | 0.045 | — |
| 11 | 1.5 g boric acid/ 1.8 AlOOH | 5.7 | 0.72 | 0.045 | — |

What is claimed is:

1. Boron-containing iron oxide black pigments obtained by the nitrobenzene reduction process, wherein the boron is present in a homogeneously doped form and the boron content amounts to 0.02 to 0.13% by weight, based on the iron oxide.

2. Iron oxide pigments according to claim 1, wherein the iron oxide pigments are iron oxide black pigments (Fe$_3$O$_4$) and the boron content amounts to 0.02 to 0.06% by weight, based on Fe$_3$O$_4$.

3. Iron oxide pigments according to claim 2, wherein the iron oxide black pigments have a sulphur content of from 0.05 to 0.08% by weight, based on Fe$_3$O$_4$.

4. A process for the preparation of iron oxide black pigments as claimed in claim 1, comprising reacting aromatic nitro compounds with metallic iron in the presence of iron salt solutions, to produce finely divided pigments consisting predominantly of Fe$_3$O$_4$, wherein the reaction is carried out in the presence of boron in the form of its soluble oxygen acids, oxides, or salts thereof in quantities of from 0.25 to 3.91 mol-% of boron, based on the aromatic nitro compounds.

5. The process as claimed in claim 4 wherein the boron is supplied from the iron salt solution which contains from 2.4 to 31 mol-% of boron, based on Fe, in the form of soluble boron compounds.

6. Iron oxide red pigments ($\alpha$-Fe$_2$O$_3$) produced by annealing iron oxide black pigments as claimed in claim 1 in air at temperatures of from 600° to 1000° C.

7. Iron oxide red pigments according to claim 6, wherein the boron content of the iron oxide red pigments amounts to 0.02 to 0.13% by weight, based on Fe$_2$O$_3$.

* * * * *